United States Patent
Adkins et al.

(10) Patent No.: US 7,094,729 B2
(45) Date of Patent: Aug. 22, 2006

(54) RANEY CATALYST PREPARATION BY GAS ATOMIZATION OF MOLTEN ALLOY

(75) Inventors: Nicholas John Elsworth Adkins, Nantwich (GB); Stephen Michael Andrew Sillitto, Newcastle-under-Lyme (GB); George Paul Yiasemides, Newcastle-under-Lyme (GB)

(73) Assignee: Ceram Research Limited, Staffordshire (GB)

( * ) Notice: Subject to any disclaimer, the term of this patent is extended or adjusted under 35 U.S.C. 154(b) by 213 days.

(21) Appl. No.: 10/240,955

(22) PCT Filed: Apr. 4, 2001

(86) PCT No.: PCT/GB01/01526

§ 371 (c)(1),
(2), (4) Date: Oct. 4, 2002

(87) PCT Pub. No.: WO01/76737

PCT Pub. Date: Oct. 18, 2001

(65) Prior Publication Data

US 2004/0074571 A1    Apr. 22, 2004

(30) Foreign Application Priority Data

Apr. 8, 2000    (GB) .................................. 0008637.1

(51) Int. Cl.
 *B01J 23/00*    (2006.01)
 *B01J 21/00*    (2006.01)
 *B01J 20/00*    (2006.01)

(52) U.S. Cl. ...................... 502/301; 502/327; 502/333; 502/334; 502/335; 502/336; 502/337; 502/338; 502/339; 502/346; 502/348; 502/414; 502/527.2; 502/527.12; 502/527.14

(58) Field of Classification Search ................ 502/301, 502/327, 330, 331, 333, 334, 335, 336, 337, 502/338, 339, 344–348, 414, 439, 527.2, 502/527.12, 527.14; 427/456
See application file for complete search history.

(56) References Cited

U.S. PATENT DOCUMENTS

| | | | |
|---|---|---|---|
| 3,637,437 A * | 1/1972 | Goldberger | 429/44 |
| 3,775,156 A | 11/1973 | Singer | |
| 3,939,097 A | 2/1976 | Takeoka et al. | |
| 4,043,946 A * | 8/1977 | Sanker et al. | 502/301 |
| 4,049,580 A * | 9/1977 | Oden et al. | 502/301 |
| 4,110,257 A * | 8/1978 | O'Hare | 502/301 |
| 4,116,804 A * | 9/1978 | Needes | 204/284 |
| 4,126,934 A * | 11/1978 | Richter et al. | 29/623.1 |

(Continued)

FOREIGN PATENT DOCUMENTS

GB    1 145 357 A    3/1969

(Continued)

*Primary Examiner*—Cam N. Nguyen
(74) *Attorney, Agent, or Firm*—Adams Evans P.A.

(57) ABSTRACT

A method of producing a Raney type catalyst, the method comprising melting together a Raney metal and aluminium to form an alloy mixture, pouring the mixture through a nozzle, directing a gas jet on to the mixture to form a spray of droplets, which droplets are directed on to a metallic substrate, the substrate material and thickness and latent heat and superheat of the sprayed material upon initial contact with the substrate being such that the temperature is sufficiently high for an exothermic reaction to take place between the alloy mixture and the substrate such that intermetallic bonds are formed therebetween, and subsequently chemically removing at least some of the aluminium from the sprayed material.

36 Claims, 2 Drawing Sheets

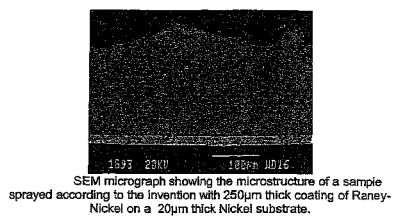

SEM micrograph showing the microstructure of a sample sprayed according to the invention with 250µm thick coating of Raney-Nickel on a 20µm thick Nickel substrate.

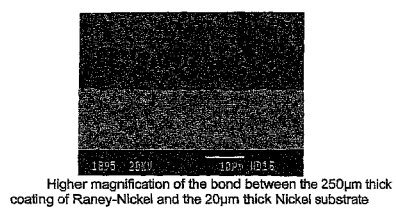

Higher magnification of the bond between the 250µm thick coating of Raney-Nickel and the 20µm thick Nickel substrate

U.S. PATENT DOCUMENTS

| | | | |
|---|---|---|---|
| 4,169,025 A | * | 9/1979 | Needes ........................ 205/534 |
| 4,450,056 A | * | 5/1984 | Gray .......................... 205/534 |
| 4,826,799 A | * | 5/1989 | Cheng et al. ................ 502/301 |
| 5,512,327 A | * | 4/1996 | Chakraborty ................ 427/455 |
| 5,993,979 A | * | 11/1999 | Figueroa et al. ............ 428/610 |
| 6,573,213 B1 | * | 6/2003 | Ostgard et al. .............. 502/301 |
| 6,747,180 B1 | * | 6/2004 | Ostgard et al. .............. 585/250 |

FOREIGN PATENT DOCUMENTS

| | | |
|---|---|---|
| JP | 51047673 B | 12/1976 |

* cited by examiner

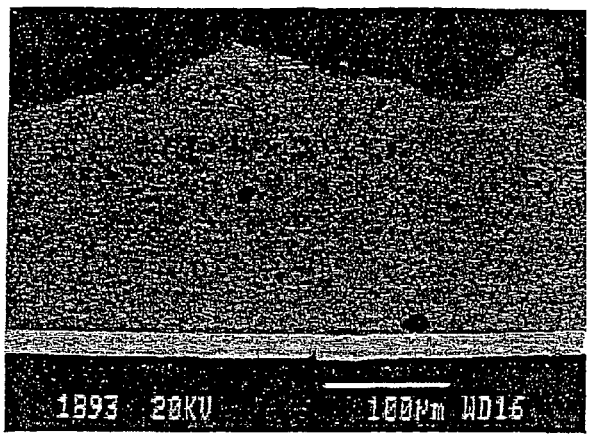

Figure 1a SEM micrograph showing the microstructure of a sample sprayed according to the invention with 250μm thick coating of Raney-Nickel on a 20μm thick Nickel substrate.

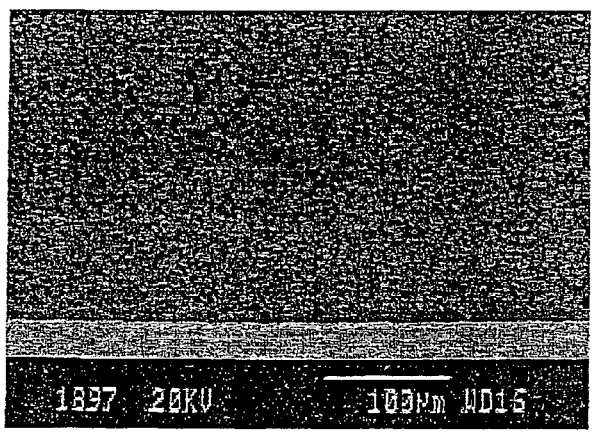

Figure 2a SEM micrograph showing the microstructure of a sample sprayed according to the invention with a 520μm thick coating of Raney-Nickel on a 75μm thick Nickel substrate.

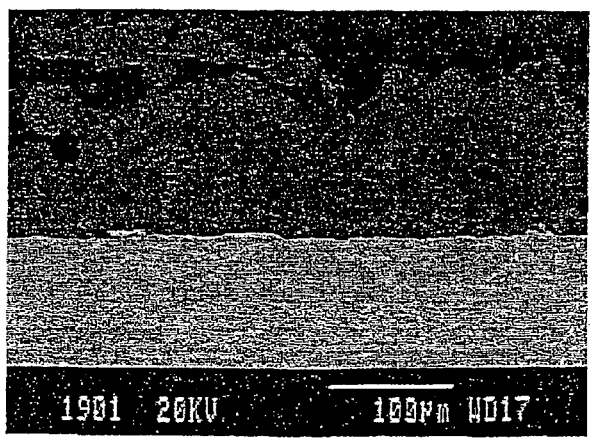

Figure 3a SEM micrograph showing the microstructure of a sample not sprayed according to the invention with a 20μm thick coating of Raney-Nickel on a 150μm thick Nickel substrate. The microstructure is rapidly solidified and there is no bond between coating and the substrate.

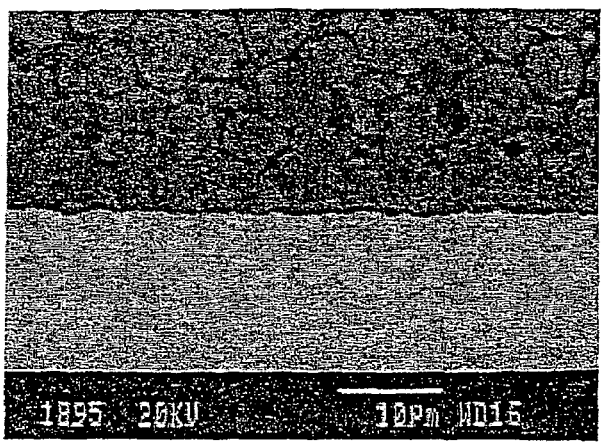

Figure 1b Higher magnification of the bond between the 250μm thick coating of Raney-Nickel and the 20μm thick Nickel substrate

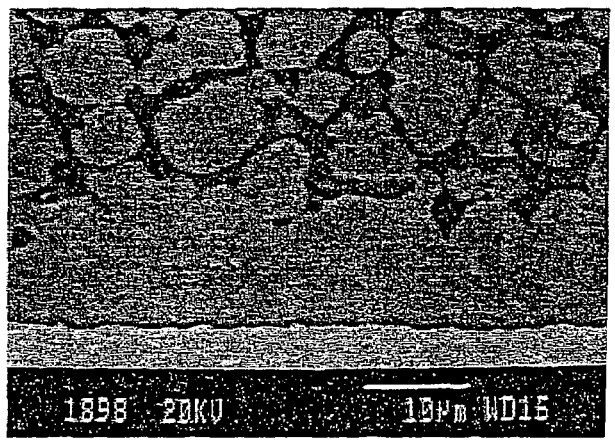

Figure 2b Higher magnification of the bond between the 520μm thick coating of Raney-Nickel and the 75μm thick Nickel substrate

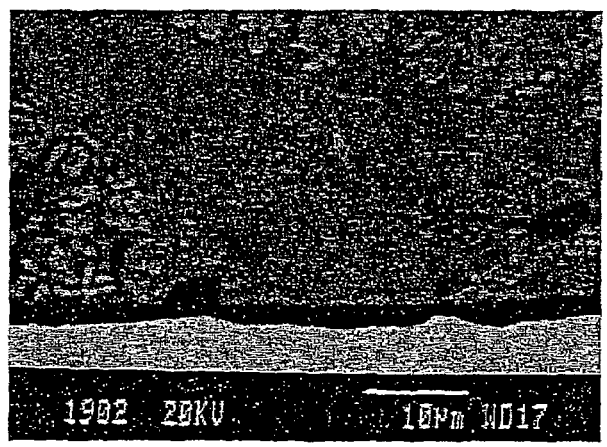

Figure 3b Higher magnification of the interface between the 120μm thick coating of Raney-Nickel and the 150μm thick Nickel substrate

RANEY CATALYST PREPARATION BY GAS ATOMIZATION OF MOLTEN ALLOY

CROSS-REFERENCE TO RELATED APPLICATIONS

This application is a national stage application, according to Chapter II of the Patent Cooperation Treaty. This application claims the priority filing date of Apr. 8, 2000 for United Kingdom Patent Application No. 0008637.1.

BACKGROUND OF THE INVENTION

This invention concerns a method of producing Raney type catalysts, and also a catalyst made by such a method.

Raney type catalysts are made by forming an alloy of a Raney metal with aluminium, and then chemically removing at least part of the aluminium to leave a Raney metal with a microporous structure. The Raney metals are nickel, copper, cobalt, iron, silver and platinum.

BRIEF SUMMARY OF THE INVENTION

According to the present invention there is provided a method of producing a Raney type catalyst, the method comprising melting together a Raney metal and aluminum to form an alloy mixture, pouring the mixture through a nozzle, directing a gas jet on to the mixture to form a spray of droplets, which droplets are directed on to a metallic substrate, the substrate material and thickness and latent heat and superheat of the sprayed material upon initial contact with the substrate being such that the temperature is sufficiently high for an exothermic reaction to take place between the alloy mixture and the substrate such that intermetallic bonds are formed therebetween, and subsequently chemically removing at least some of the aluminium from the sprayed material.

The Raney metal and aluminium are preferably melted together at a temperature above the liquidus of the alloy mixture.

The alloy mixture may be a nickel-aluminum alloy, which desirably contains 40–60 weight percent nickel.

Alternatively the alloy mixture may be a copper-aluminum alloy, which desirably contains 45–55 weight percent copper.

Alternatively the alloy mixture may be a cobalt-aluminum alloy, which desirably contains 45–55 weight percent cobalt.

Alternatively the alloy mixture may be an iron-aluminium alloy, which desirably contains 45–55 weight percent iron.

Alternatively the alloy mixture may be a silver-aluminium alloy, which desirably contains 50–80 weight percent silver.

Alternatively the alloy mixture may be a platinum-aluminium alloy, which desirably contains 45–65 weight percent platinum.

The aluminium is preferably removed from the sprayed material using an aqueous alkaline solution, which may be sodium or potassium hydroxide.

The substrate preferably has a solidus above the solidus of the alloy mixture. The substrate preferably comprises one of iron, mild steel, stainless steel, titanium, nickel or copper. The substrate may be in the form of a foil or gauze. The substrate is preferably initially cleaned, and may be degreased and/or chemically etched.

The gas jet is preferably directed on to the mixture immediately downstream of the nozzle.

The gas jet may comprise argon or nitrogen. The spraying preferably takes place in a substantially non-reactive atmosphere, which atmosphere may comprise argon or nitrogen.

The substrate may be heated prior to spraying.

A subsequent layer or layers of the alloy mixture may be sprayed on to the initial layer formed on the substrate. The spraying of the subsequent layer or layers is preferably carried out such that there is sufficient heat for diffusion bonds to be formed between the alloy mixture layers.

The relative position of the substrate is preferably changed during formation of the layer or layers, whereby to provide a substantially even thickness of the sprayed material.

The substrate may be sprayed on opposite sides thereof. The substrate may be rolled to a required thickness following spraying. The substrate may be subject to heat treatment following spraying.

Over-sprayed material is preferably collected, and may be re-used.

The invention also provides a Raney type catalyst made by a method according to any of the preceding sixteen paragraphs.

BRIEF DESCRIPTION OF THE DRAWINGS

Examples of the present invention will now be described by way of example only, and with reference to the accompanying figures, in which:

FIGS. 1a and 1b and 2a and 2b are microscopic sectional views of sprayed substrates according to the invention; and FIGS. 3a and 3b are similar views of a substrate not according to the invention.

DESCRIPTION OF THE PREFERRED EMBODIMENT AND BEST MODE

A Raney type catalyst may be formed by coating a metallic substrate with a Raney alloy, and subsequently removing at least some of the aluminium from the alloy.

The substrate to be coated may be any metallic material having the needed mechanical properties that has chemical resistance to the activating solution (used to remove the aluminium) and which has a melting solidus above the solidus of the Raney coating alloy, typically around 650° C. Suitable materials are iron, mild steel, stainless steel, titanium, nickel, copper etc. Normally, the substrate will be foil without perforations though it may be gauze. Prior to being coated the surface of the substrate to be sprayed should be clean. This could be achieved through degreasing or chemical etching methods.

Listed below are possible Raney alloys, indicating the element to be mixed with aluminium, the proportion of that element, and the liquidus temperature range for alloys of such material.

| ELEMENT | PROPORTION BY WEIGHT OF ELEMENT | LIQUIDUS TEMPERATURE |
| --- | --- | --- |
| Nickel | 40–60 | 1050–1550° C. |
| Copper | 45–55 | 550–600° C. |
| Cobalt | 45–55 | 1300–1500° C. |
| Iron | 45–55 | 1150–1250° C. |
| Silver | 50–80 | 600–700° C. |
| Platinum | 45–65 | 1000–1300° C. |

A melt of the desired composition is produced by heating the alloy constituents together. The temperature is raised above the liquidus of the alloy and the melt is then poured through a nozzle. At the tip of the nozzle the melt is disrupted by a high energy gas jet or jets, or a continuous shroud is formed by an annulus, of gas, and melt droplets are produced. The gas of the jet may be argon or nitrogen.

Any Raney alloy can be sprayed provided its solidus is below that of the substrate and that there is a reaction between the molten coating and substrate at the equilibrium temperature. Heat transfer from the sprayed coating to the substrate is very rapid and the equilibrium temperature is the temperature of the coating and substrate after this heat transfer is complete. In particular a Raney alloy such as nickel 50 wt %-aluminium 50 wt % is well suited to the process. Alloy additions, such as promoters, can be easily made to the alloy prior to spraying.

The melt droplets are directed at the substrate. A mixture of solidified, partly solidified and liquid droplets of the melt, impact on the substrate. The transfer of heat energy from the impacted droplets heats the substrate until the coating and substrate reach an equilibrium temperature. The following parameters are chosen such that the temperature is sufficient for an exothermic reaction to occur between the sprayed material and the substrate. This reaction takes place at the interface between the sprayed material and the substrate to produce intermetallic bonding, thereby producing a coherent bond between the sprayed material and substrate. This reaction releases heat, thereby increasing the time during which the coating remains molten and allowing the interfacial bond to thicken.

The spraying process is adjusted to control the microstructure. The heat flux of the sprayed coating per m$^2$ of substrate is controlled so that the temperature of the substrate after the inItial heat transfer Is above the solidus of the coating but below the solidus of the substrate. This is controlled through the speed of the substrate movement, the distance of the spray nozzle from the substrate, the flow rate of the melt through the nozzle, the flow rate of the atomizing gas, the temperature of the atomizing gas, the temperature of the substrate, the thickness of the substrate foil and the melt superheat. In some instances it may be necessary or appropriate to pre-heat the substrate.

To produce a coated foil with the desired thickness and width of coating, the substrate and/or nozzle and/or melt spray can be moved. The deposition is preferably carried out in a non-reactive atmosphere such as nitrogen or argon Over-sprayed powder is collected in a container beneath the substrate. This over-sprayed powder can be reintroduced into the spray cone and be incorporated in the coating to ensure full utilisation of the coating material. The spraying process is controlled to minimise the amount of powder that is over-sprayed. If a large amount of powder is over-sprayed it may have to be heated prior to incorporation to ensure that the equilibrium temperature of the coating is above its solidus. The spray is oscillated to give an even coating, and/or multiple nozzles are used. The substrate can be coated on both sides.

The substrate is tensioned during spraying to help maintain flatness but may be rolled following spraying to flatten or achieve a required thickness, and the sheet could be formed as a continuous strip that can be cut into required lengths. The coated sheet could be subjected to a heat treatment to further coarsen the microstructure or to improve the bond between the coating and the substrate. Subsequent layers of the alloy mixture may be formed by spraying. The parameters in this instance are chosen such that there is sufficient heat for diffusion bonds to be formed between the alloy mixture layers.

Once spraying is complete aluminium is removed by immersing the coated substrate in a dilute aqueous solution of sodium or potassium hydroxide. The aluminium reacts with the alkaline solution to produce hydrogen and sodium or potassium aluminate. It is not possible though to remove all of the aluminium, and the final catalyst may contain up to 20% weight percent aluminium.

Specific examples of the invention will now be described. Examples 1 and 2 are according to the invention, whilst Example 3 illustrates the outcome if the invention is not followed, and therefore Example 3 is not according to the invention. In these Examples a nickel-aluminium alloy of composition 50 wt % nickel-50 wt % aluminium was sprayed at a melt temperature of 1540° C., a superheat of approximately 200° C. above the liquidus of the alloy. The substrate dimensions of the listed examples were 41 mm×90 mm. The gas flow rate for each was 1.58 kg/mm and the atomizing gas was high purity argon. The substrate was 99% pure nickel foil in each example.

EXAMPLE 1

A 20 μm thick nickel substrate was sprayed at a distance of 337 mm from the atomization nozzle tip. The melt flow rate was 1.0 kg/min. The substrate was coated in a single pass with an even coating 250 μm thick. FIGS. 1a and 1b show the coating is a homogeneous mixture of the intermetallic phases $Ni_3Al$ and $Ni_2Al_3$ with no evidence of particle/particle boundaries. Adhesion of the coating to the substrate is excellent due to the development of a $Ni_2Al_3$ intermetallic layer at the interface between the nickel substrate and the nickel-aluminium coating. This layer can clearly be seen in FIGS. 1a and 1b as a grey layer above the light substrate layer.

EXAMPLE 2

A 75 μm thick nickel substrate was sprayed at a distance of 350 mm from the atomization nozzle tip. The melt flow was 1.2 kg/min. The substrate was coated in a single pass with an even coating 520 μm thick FIGS. 2a and 2b show this coating is also a homogeneous mixture of the intermetallic phases $Ni_3Al$ and $Ni_2Al_3$ with no evidence of particle/particle boundaries. The adhesion of the coating to the substrate is again excellent due to the development of the $Ni_2Al_3$ intermetallic layer at the interface between the nickel substrate and the nickel-aluminium coating, which layer is clearly visible in FIGS. 2a and 2b.

EXAMPLE 3 (NOT ACCORDING TO THE INVENTION)

A 150 μm thick nickel substrate was sprayed at a distance of 398 mm from the atomization nozzle tip. The melt flow was 1.1 kg/mm. The substrate was coated in a single pass with an even coating 120 μm thick. A cross-section of this coating is shown in FIGS. 3a and 3b. In this example the substrate thickness is greater than the predefined maximum thickness at which the capacity of the foil to absorb heat from the deposit is equal to the latent heat and superheat of the deposit plus the exothermic contribution from the formation pf any intermetallic at the surface of the substrate. Therefore the microstructure of the catalyst coating is rapidly solidified. Discrete atomized particles are visible, as is the fine scale structure of splat-quenched material in the particle-particle voids. This rapidly solidified coating is still two phase but on a scale too fine to be resolved at this magnification. There is no visible $Ni_2Al_3$ intermetallic layer at the interface between the nickel substrate and the nickel-aluminium coating and the coating is poorly adhered to the substrate.

The supported catalyst produced by the described process has several advantages over widely used particulate material. Because the supported catalyst can be removed in one piece from the activating solution the volume of water required for washing is reduced, reducing water waste and increasing the concentration of sodium or potassium aluminate solution produced. This increase in concentration reduces the weight of the solution that needs to be transported to users of the aluminate. The activation process is also much quicker as there is no settling time required for the supported catalyst. The standard particulate material is slow to settle, an important step in the washing process, leading to extended activation times.

Similarly, removal of the catalyst from a reaction vessel is simple and quick and the need to handle fine pyrophoric powders is removed. This will allow Raney type catalysts to be used in reactions to which they have previously been unsuitable as they were difficult to remove from the reaction product. The catalyst can be used as a long strip for a continuous reaction, or cut into small pieces to be used as a heterogeneous catalyst with reduced settling times. The supported catalyst has good durability and life span, and also good activity.

As indicated above the various parameters can be altered and chosen as dictated by the specific materials used.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of producing a Raney type catalyst, the method comprising melting together a Raney metal and aluminum to form a molten alloy mixture; pouring the molten mixture through a nozzle, directing a gas jet on to the mixture to form a spray of droplets, which droplets are directed on to a metallic substrate, wherein the material of the substrate and the thickness, the latent heat, and the superheat of the sprayed material are selected such that, upon initial contact with the substrate, the temperature is sufficiently high for an exothermic reaction to take place between the alloy mixture and the substrate such that intemietallic bonds are formed therebetween; and subsequently chemically removing at least some of the aluminum from the sprayed material.

2. A method according to claim 1, wherein the Raney metal and aluminum are melted together at a temperature above the liquidus of the alloy mixture.

3. A method according to claim 1, wherein the alloy mixture is a nickel-aluminum alloy.

4. A method according to claim 3, wherein the alloy mixture contains 40–60 weight percent nickel.

5. A method according to claim 1, wherein the alloy mixture is a copper-aluminum alloy.

6. A method according to claim 5, wherein the alloy mixture contains 45–55 weight percent copper.

7. A method according to claim 1, wherein the alloy mixture is a cobalt-aluminum alloy.

8. A method according to claim 7, wherein the alloy mixture contains 45–55 weight percent cobalt.

9. A method according to claim 1, wherein the alloy mixture is an iron-aluminum alloy.

10. A method according to claim 9, wherein the alloy mixture contains 45–55 weight percent iron.

11. A method according to claim 1, wherein the alloy mixture is a silver-aluminum alloy.

12. A method according to claim 11, wherein the alloy mixture contains 5–80 weight percent silver.

13. A method according to claim 1, wherein the alloy mixture is a platinum-aluminum alloy.

14. A method according to claim 13, wherein the alloy mixture contains 45–65 weight percent platinum.

15. A method according to claim 1, wherein the aluminum is removed from the sprayed material using an aqueous alkaline solution.

16. A method according to claim 15, wherein the aqueous alkaline solution is sodium or potassium hydroxide.

17. A method according to claim 1, wherein the substrate has a solidus above the solidus of the alloy mixture.

18. A method according to claim 1, wherein the substrate comprises one of iron, mild steel, stainless steel, titanium, nickel or copper.

19. A method according to claim 1, wherein the substrate is in the form of a foil or gauze.

20. A method according to claim 1, wherein the substrate is initially cleaned.

21. A method according to claim 20, wherein the substrate is initially degreased and/or chemically etched.

22. A method according to claim 1, wherein the gas jet is directed on to the mixture immediately downstream of the nozzle.

23. A method according to claim 1, wherein the gas jet comprises argon or nitrogen.

24. A method according to claim 1, wherein the spraying takes place in a substantially non-reactive atmosphere.

25. A method according to claim 24, wherein the atmosphere comprises argon or nitrogen.

26. A method according to claim 1, wherein the substrate is heated prior to spraying.

27. A method according to claim 1, wherein a subsequent layer or layers of the alloy mixture is sprayed onto the initial layer formed on the substrate.

28. A method according to claim 27, wherein the spraying of the subsequent layer or layers is carried out such that there is sufficient heat for diffusion bonds to be formed between the alloy mixture layers.

29. A method according to claim 27, wherein the relative position of the substrate is changed during formation of the layer or layers, whereby to provide a substantially even thickness of the sprayed material.

30. A method according to claim 27, wherein the substrate is sprayed on opposite sides thereof.

31. A method according to claim 27, wherein the substrate is rolled to a required thickness following spraying.

32. A method according to claim 27, wherein the substrate is subject to heat treatment following spraying.

33. A method according to claim 27, wherein the over-sprayed material is collected.

34. A method according to claim 33, wherein the over-sprayed material is re-used.

35. A Raney type catalyst, wherein the catalyst is made by a method comprising melting together a Raney metal and aluminum to form a molten alloy mixture; pouring the molten mixture through a nozzle, directing a gas jet on to the mixture to form a spray of droplets, which droplets are directed on to a metallic substrate, wherein the material of the substrate and the thickness, the latent heat, and the superheat of the sprayed material are selected such that, upon initial contact with the substrate, the temperature is sufficiently high for an exothermic reaction to take place between the alloy mixture and the substrate such that intermetallic bonds are formed therebetween; and subsequently chemically removing at least some of the aluminum from the sprayed material.

36. A method of producing a Raney type catalyst, the method comprising melting together a Raney metal and aluminum to form a molten alloy mixture; pouring the molten mixture through a nozzle, directing a gas jet on to the mixture to form a spray of droplets in a substantially non-reactive atmosphere, which droplets are directed on to a metallic substrate, wherein the material of the substrate and the thickness, the latent heat, and the superheat of the sprayed material are selected such that, upon initial contact with the substrate, the temperature is sufficiently high for an exothermic reaction to take place between the alloy mixture and the substrate such that intermetallic bonds are formed therebetween; and subsequently chemically removing at least some of the aluminum from the sprayed material.

* * * * *

UNITED STATES PATENT AND TRADEMARK OFFICE
CERTIFICATE OF CORRECTION

PATENT NO. : 7,094,729 B2 Page 1 of 1
APPLICATION NO. : 10/240955
DATED : August 22, 2006
INVENTOR(S) : Adkins et al.

It is certified that error appears in the above-identified patent and that said Letters Patent is hereby corrected as shown below:

Column 5, line 52, delete "intemietallic" and enter –intermetallic--.

Signed and Sealed this

Seventh Day of November, 2006

JON W. DUDAS
*Director of the United States Patent and Trademark Office*